No. 699,736. Patented May 13, 1902.
A. A. WOODYATT.
CLOTHES LINE.
(Application filed Aug. 17, 1901.)
(No Model.)
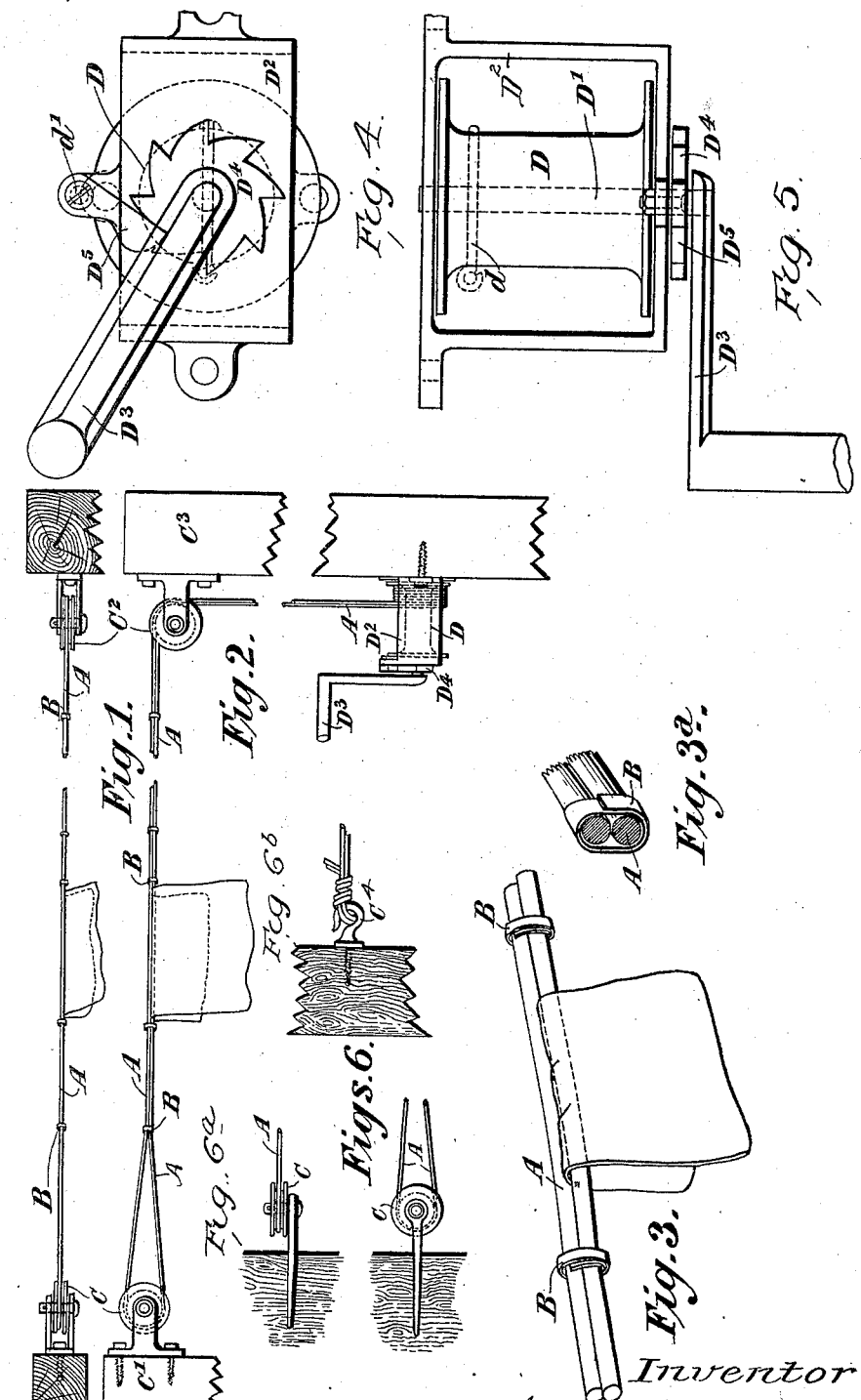

UNITED STATES PATENT OFFICE.

ANTHONY ALLEN WOODYATT, OF TRARALGON, VICTORIA, AUSTRALIA.

CLOTHES-LINE.

SPECIFICATION forming part of Letters Patent No. 699,736, dated May 13, 1902.

Application filed August 17, 1901. Serial No. 72,414. (No model.)

*To all whom it may concern:*

Be it known that I, ANTHONY ALLEN WOODYATT, a subject of the King of Great Britain, and a resident of Traralgon, Victoria, Australia, have invented certain new and useful Improvements in Clothes-Lines, of which the following is a specification.

This invention relates to an improved clothes-line in the employment of which props and clothes-pins become unnecessary. In place of having one stretched wire line I provide a single wire doubled, the two parts of which are held close together at intervals when the wires are drawn taut by movable clasps or clips, and it is between the two stretched strands or wires that the clothes are held. The doubled or loop end of the wire line is secured at a suitable height on a sheave attached to a wall, post, or other support, while the other end of the two stretched wires forming the line pass over and are carried at the requisite elevation by a small sheave or pulley, the wires then descending to around a small winding drum or reel furnished with a handle and a retaining pawl and ratchet.

The invention will now be described, aided by a reference to the accompanying sheet of drawings, in which—

Figure 1 is a plan, and Fig. 2 a side, view of my improved clothes-line; Fig. 3, an enlarged view of the two strands or wires as clasped together to form the line, and Fig. $3^a$ sectional view of same; Fig. 4, side view, and Fig. 5 plan, of the winding-drum; and Figs. 6 and $6^a$ details of the sheave at loop or doubled end of line. Fig. $6^b$ is a detail view of modified means for holding the line.

A A are the two stretched strands of a single wire, doubled and laid together to form the line, and B the movable metal clasps which hold them close together.

C is the sheave for supporting the loop or doubled end of the line, or a hook $C^4$, as shown in Fig. $6^b$, or staple could be used in place of the sheave shown.

$C^2$ is the guide-sheave or pulley at other end of line, the sheave C being shown attached to a support or post $C'$ and the sheave $C^2$ to a support or post $C^3$.

D is the winding-drum, carried on and secured by pin $d$ to a spindle $D'$, supported in a suitable bracket-piece $D^2$, which can be secured at the desired height by screws or bolts upon a convenient support, as $C^3$. Said screws pass through lugs at the opposite ends of the bracket-piece. These lugs are of similar form; but one is shown broken away in Figs. 4 and 5.

$D^3$ is a handle for operating the drum in order that the line may be lowered or be drawn taut, as required, and $D^4$ is a ratchet-wheel also secured on said spindle $D'$.

$D^5$ is a pawl pivoted at $d'$ on bracket $D^2$, and which pawl-and-ratchet gear retains the drum at the requisite position.

The said clasps B for securing the doubled wires A A, forming the line, together side by side are made of a narrow strip of pliable metal—such as iron, tin, zinc, or brass—such strip being wound around the two strands or parts of the doubled wire to form the clasps, and which may be slid along the line to suit the width of the clothes which are to be held upon the line by being gripped between the doubled wires A A, forming the line, as shown.

The operation of placing the clothes upon the line and clamping them is accomplished by spreading or sliding the clasps apart at a distance greater than the width of the clothes, then placing a part of the cloth which it is desired to hang on the line between the two wire strands, when afterward the clasps are drawn or slid along the line to close upon the clothes, and by so doing the cloth will be tightly clamped between the two strands forming the line.

I claim—

The herein-described improved clothes-line consisting of the combination of the single wire doubled on itself to form two strands A A, metal clasps B adapted to be slid along the line and hold the two strands together, sheaves C and $C^2$ supporting the line from posts $C'$ and $C^3$, winding-drum as D, furnished with pawl $D^5$ and ratchet-wheel $D^4$ all assembled and arranged substantially as described.

In witness whereof I have hereunto set my hand in presence of two witnesses.

ANTHONY ALLEN WOODYATT.

Witnesses:
   BEDLINGTON BODYCOMB,
   N. J. S. THOMPSON.